United States Patent
Whitfield et al.

(10) Patent No.: US 7,751,540 B2
(45) Date of Patent: Jul. 6, 2010

(54) "ALWAYS-ON" TELEMETRY SYSTEM AND METHOD (75) Inventors: Andrew Whitfield, Mosborough (GB); Gordon Smythe, Ash (GB); Geoffrey Girdler, Villa Rica, GA (US)

(73) Assignee: Emizon Group Ltd. (GB)

( * ) Notice: Subject to any disclaimer, the term of this patent is extended or adjusted under 35 U.S.C. 154(b) by 480 days.

(21) Appl. No.: 11/678,185

(22) Filed: Feb. 23, 2007

(65) Prior Publication Data
US 2007/0140449 A1 Jun. 21, 2007

Related U.S. Application Data (63) Continuation of application No. 10/939,714, filed on Sep. 13, 2004, now abandoned.

(51) Int. Cl.
H04M 11/00 (2006.01)
(52) U.S. Cl. .................................. 379/106.01
(58) Field of Classification Search ............ 379/106.01, 379/106.02, 106.03, 37–39, 45, 90.01, 93.07
See application file for complete search history.

(56) References Cited

U.S. PATENT DOCUMENTS

6,559,769 B2 5/2003 Anthony et al.
6,928,148 B2 8/2005 Simon et al.
2005/0242945 A1 11/2005 Perkinson

*Primary Examiner*—Stella L Woo
(74) *Attorney, Agent, or Firm*—The Law Firm of H. Dale Langley, Jr., P.C.

(57) ABSTRACT

A telemetry system includes at least one telemetry communication device for handling security event information available to the telemetry communication device. The system also includes a central host device, and an "always on" network, such as the Internet, communicatively connected to the telemetry communication device and the central host device, for communications between the telemetry communication device and the central host device. Encryption key information is exchanged between the central host device and the telemetry communication device, via a secure path, such as a cellular telephone call between the devices wherein identity and authentication can be ensured by Calling Line Identity information, or other secure exchange. Telemetry information is communicated by the telemetry communication device and the central host device over the "always on" network, in encrypted format according to the particular encryption keys exchanged. The central host device also communicates the telemetry information to a monitor service, over the "always on" network and in encrypted format after secure exchange of encryption keys between the central host device and the monitor service. The system can also include a back-up path for communications of telemetry information in the event that the "always on" network is unavailable for the communications.

21 Claims, 5 Drawing Sheets

"ALWAYS-ON" TELEMETRY SYSTEM AND METHOD

INCORPORATION BY REFERENCE

The present application is a continuation of U.S. patent application Ser. No. 10/939,714, filed Sep. 13, 2004 now abandoned, titled "Telemetry Using 'Always-On' Communication Connection System and Method", and the present application is co-pending with and has in common three of the inventors of the referenced application, and the referenced application is hereby incorporated herein by this reference thereto.

BACKGROUND OF THE INVENTION

The present invention generally relates to telemetry systems and methods and, more particularly, relates to telemetry systems and methods incorporating alarm signaling over an "always on" communications connection, such as a broadband Internet network connection.

Location-based security, such as, for example, in the home or office, is conventionally implemented through connected systems of cameras, security detectors, wire contact elements and similar devices. These devices are connected, typically, through dedicated wires interconnecting the detection devices with monitoring station hardware and the like. These security systems generally communicate alarm signals either locally within the system for monitor by localized security personnel or otherwise transmit such signals to remote locations over the telephone or dedicated communications lines.

The plain old telephone services (POTS) and related local loop and switching infrastructure of the wired telephone companies have been employed in the conventional security systems to provide alarm signaling. These security systems connect, at the secured location, to the POTS directly, or through local private branch exchange (PBX) or switching equipment. In implementations requiring added security, dedicated communications lines have been employed to communicate alarm signals.

To be effective, security systems must provide reliable and substantially continuous alarm signaling communications capability. The conventional security systems have employed localized dedicated human intervention, telephone line signaling, and the like. Most sites being secured by telemetry systems, however, already have access and connectibility to substantially continuously operational networks, such as, for example, broadband Internet or Intranet connections or similar communicative networks servicing the sites.

It would be a significant improvement in the art and technology to provide telemetry systems that allow access via "always on" communications paths. It would further be an improvement in the art and technology to provide for accessibility by and to the telemetry systems and signals from locations remote from the secured premises or location. Providing such telemetry operations through generally widely available and often already-existing infrastructure, for example, as a value-add service and the like, would be advantageous and economically attractive. The present invention provides numerous advantages and improvements, including in the foregoing respects.

SUMMARY OF THE INVENTION

An embodiment of the invention is a telemetry system. The system includes a telemetry communication device, a central host device, and an "always on" network communicatively connected to the telemetry communication device and the central host device, for communications between the telemetric communication device and the central host device.

Another embodiment of the invention is a telemetry system. The system includes an "always on" network. Telemetry communications on the network conform to TCP/IP protocols.

Yet another embodiment of the invention is a method of telemetry. The method includes communicating identity and authentication information via a secure path from a telemetry device to a central host, communicating the identity and authentication information via a second secure path from the central host to a monitor service device, communicating an encryption key to the telemetry device via the secure path, communicating an encryption key to the monitor service device via the second secure path, communicating encrypted telemetry information over an "always on" network, by the telemetry device to the central host, and communicating encrypted information in respect of the encrypted telemetry information over the "always on" network, by the central host to the monitor service device.

Another embodiment of the invention is system for telemetry. The system includes a telemetry communications device, a central host device, communicatively connected to the telemetry communications device by an "always on" network, wherein the telemetry communications device and the central host device communicate over the "always on" network via encrypted data signals.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
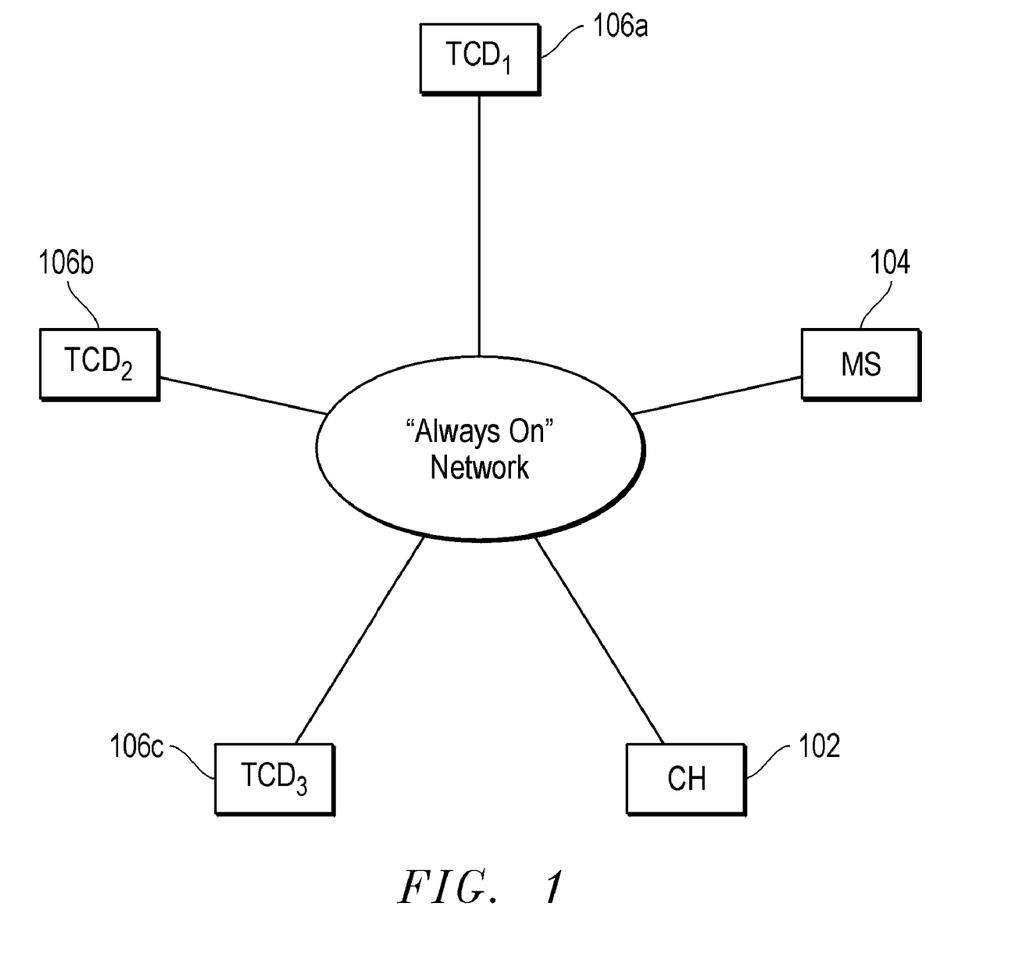
FIG. 1 illustrates a telemetry system for communicating telemetry information over an "always on" network, such as the Internet, according to certain embodiments of the invention.

Referring to FIG. 1, an "always on" communication link, such as a communications network 100, for example, the Internet, communicatively connects a central host (CH) 102, a monitoring station (MS) 104, and one or more telemetry communications devices (TCDs) 106a, b, c. For example purposes in the Figure, TCDs 106a, b, and c, respectively, are shown, however, there can be any other number of such devices. The TCDs 106a, b, c each are independently capable to communicate with the CH 102 and the MS 104 over the network 100.

The network 100 can, itself, be comprised of numerous and varied communicatively interconnected elements and devices, in addition to those shown in the Figure. For example, the network 100, if the Internet or similar communications network, includes wired, wireless, optical, radio frequency (RF), satellite and/or any other present or future similar communications interconnections (or combinations) among elements and devices, permitting communications thereover between the elements and devices. Additionally, the elements and devices so interconnected can include switches, servers, routers, and other linking and signal directing features. Of course, as is typical with the network 100, such as the Internet, various communications devices of the network 100 can themselves have individual, separate and/or distinct communications and processing capabilities apart from or in conjunction with the inter-communicability over the network 100.

A specific feature of the network 100 is that it is capable of "always on" operations. In other words, notwithstanding that certain links, elements, devices, and other features of the network 100 may be inoperable or disconnected for communications at any instance, the network 100 includes alternate and virtually continuously in service link paths between the various communicative elements and devices of the network.

Because of the use of such an "always on" feature of the network 100 in enabling and effecting communications between and among devices and elements of the network 100, including the CH 102, the MS 104 and the TCDs 106a, b, c, the network 100 permits substantially continuous signaling to and from each of the TCDs 106a, b, c with the CH 102 and the MS 104, as well as possibly other elements and devices (although not shown in the Figure).

Each of the TCDs 106a, b, c is itself a security signaling device, or is incorporated with such device. For example, security devices can include motion sensors, video cameras, electrical contact/circuit break sensors, and many more types of security devices now or hereafter conceived or implemented. The TCD 106a,b, or c, as the case may be, is included in or otherwise connected to a respective security device to provide a signal to a remote location from the secured location. The TCDs 106a, b, c in the Figure, provide security signaling over the "always on" network 100. The particular communicative paths and modes for the TCDs 106a, b, c over the "always on" network 100 can vary widely according to available technologies, as hereinafter discussed. In any event, a major advantage of the embodiments is that the security devices communicate security signaling via the related TCDs 106a, b, c, over the "always on" network 100, providing a substantially continuous and uninterrupted operational capability for telemetry signaling.

The CH 102 of the network 100 receives from the TCDs 106a, b, c over the "always on" network 100, and communicates with and between the TCDs 106a, b, c thereover. As hereafter detailed, telemetry signals between and among the TCDs 106a, b, c and the CH 102 are encrypted data, to provide secure communications in the network 100. The CH 102 of the network 100 also communicates, via secure encrypted data communications over the network 100, with the MS 104. The MS 104 of the Figure and embodiment is representative of a wide variety of possible elements, devices, and features, that have and provide the operational functionality of monitoring security as reported from remote locations of the respective TCDs 106a, b, (and included security devices therewith). In general operations, the TCDs 106a, b, c securely communicate any security data or information to the CH 102 over the network 100, and the CH 102 then securely communicates relevant signals to the MS 104. The MS 104 handles security events that may be triggered, according to the particular design of the systems, as provided and desired in the application of the network 100, features, and arrangements.

Figure 2:
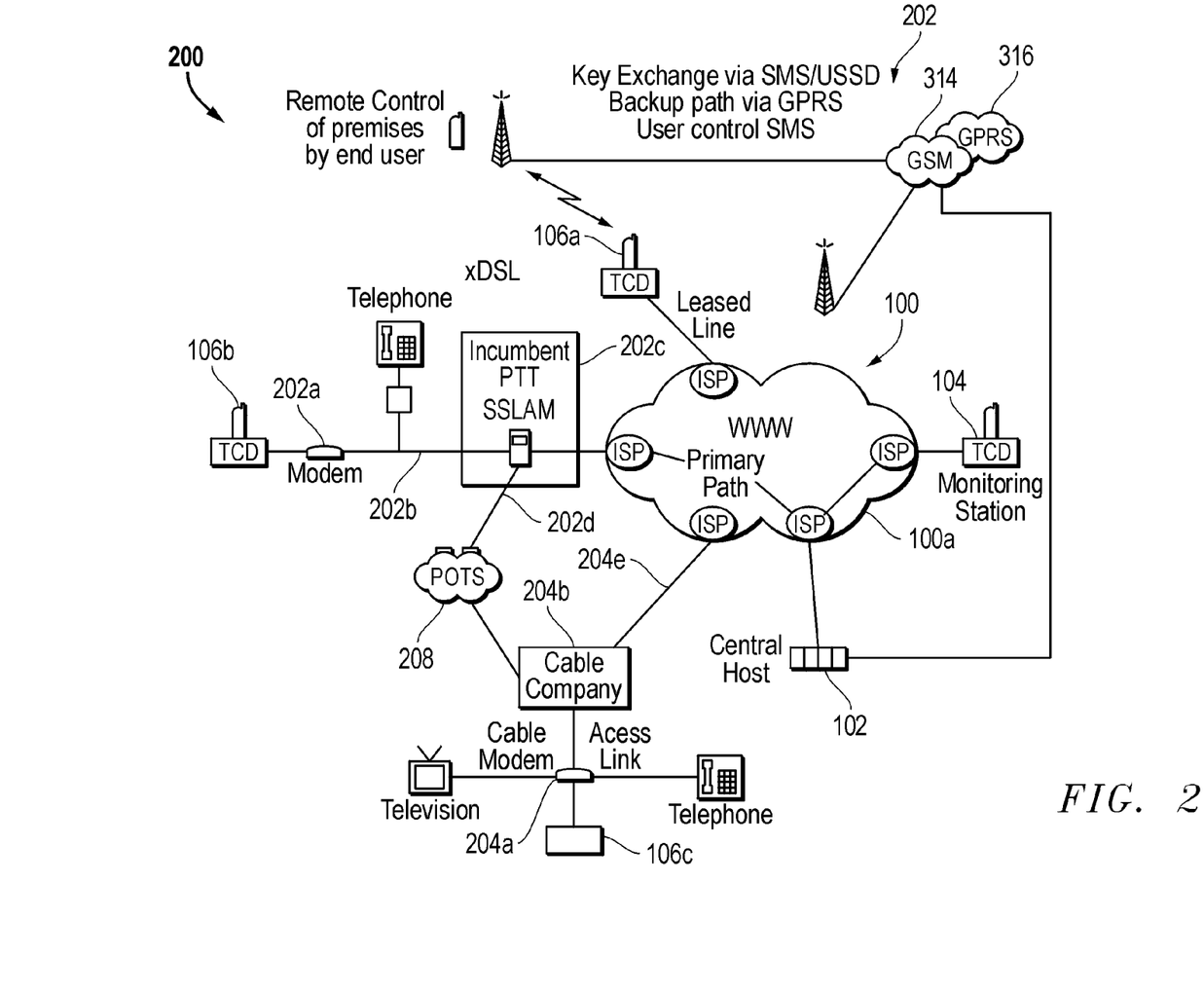
FIG. 2 illustrates a telemetry system for communicating telemetry information over an "always on" network, the Internet, and including three separate telemetry communications devices and connectivity possibilities for such devices to the network, and also including a central host and monitoring station, wherein telemetry information is communicated between devices over the network in encrypted form, in accordance with encryption keys exchanged through wireless calls, according to certain embodiments of the invention.

Referring to FIG. 2, the "always on" network 100 is shown in more detail in an embodiment of an entire telemetry system 200, providing for avenues for telemetry signaling and also for security of communications via encryption key exchange and the like. The telemetry system 200 includes two separate and distinct communications or information exchange paths—one of the paths is the "always on" network 100 for telemetry signaling as has been previously described, and the other of the paths can be any of a variety of modes of information exchange. For example, one mode for this other information exchange path can include a cellular wireless communication network 202.

The wireless communication network 202 can be, for example, a Global System for Mobile communication (GSM), General Packet Radio Services (GPRS), Short Message Service (SMS), third-generation wireless (3G) and/or any other current or future wireless communications technology, standard, or system. As hereafter explained, this other path for information exchange is utilized in the system 200 for exchange of data and information that secures the operations of the "always on" network 100 in order to provide secure, efficient, and robust telemetry operations and capabilities over the "always on" network 100. In fact, although not shown in the Figure, a personal hand delivery, mail, e-mail or other similar mode could be employed as the other path for information exchange, so long as this exchange is secure in accordance with the desired level of security for the operations of the system 200.

The network 100, as has been previously described, is the Internet or other publicly accessible "always on" communicative networks. Alternatives to the Internet as the network 100 can include, among others, a private Intranet, virtual private network (VPN), proprietary or other private network, or other continually operating network system. For purposes of the description herein, the network 100 is addressed as though it is the Internet; however, all other possible communications channels and networks are and will be known and understood by those skilled in that art, as included in, alternative to, in addition to, or in combination with, the network 100 including the Internet and as being included within the scope of the embodiments. All such communications channels and networks, now or in the future, are included in the description herein.

In the network 100 comprised of the Internet 100a in FIG. 2, each of the TCDs 106a, b, c, as well as the CH 102 and the MS 104 communicatively connect to the Internet via largely readily and generally available connectors. Of course, all other possible network connectors not specifically shown in FIG. 2 are also possible in the embodiments. For example, each TCD 106a, b, c, the CH 102, and the MS 104 will connect through a respective Internet Service Provider (ISP) and related hardware and software and other features for the network 100 connectivity.

For instance, the TCD 106a, in the example, is connected directly to the network through a dedicated leased line, such as a T-1 or other dedicated line connection. This leased line connects to the Internet 100a through an applicable ISP or other similar connection. In the instance of the TCD 106a, the leased line, itself, provides "always on" connectivity to the Internet 100a, and, of course, the Internet 100a is an "always on" network for communications among the network connected devices and elements, including the CH 102 and the MS 104.

The TCD 106b, in the example, is connected to a Digital Subscriber Line (DSL) modem over a telephone network, in order to provide "always on" DSL communications over and between the Internet 100a. As is known, DSL connectivity service can vary among several available access modes and arrangements. In any event, the DSL connectivity of the TCD 106b and the Internet 100a can be over standard telephone connections or otherwise, and can also provide substantially continuous and "always on" communications to and from the Internet 106b.

In the particular example of FIG. 2, the TCD 106b is specifically communicatively connected, via a modem 202a and a telephone system 202b, including a post telephone and telegraph arrangement (PTT) 202c. The telephone system 202b can, for example, include the Plain Old Telephone System (POTS) 202b, 202d or other wired telephone infrastructure. The telephone system 202b is communicatively connected with the "always on" network 100, such as the Internet 100a, through a respective ISP, or other access provider for the network 100. In the particular example, of course, the TCD 106b communicatively connects to the network 100 via DSL service providing an always on connection to the always on Internet 100a, or otherwise.

The TCD 106c, in the example, is another communications device that connects to and with the network 100 via an "always on" mode of connection, such as cable connection with a cable company. The TCD 106c connects to a cable modem 204a, and the cable modem provides Internet 100a access via the always on cable system through a connected and applicable cable company 204b and connector 204c of the company 204b and ISP of the Internet 100a. The cable company 204b, as is typical, includes cable company provider infrastructure connected to the network 100.

Continuing to refer to FIG. 2, the network 100, such as the Internet 100a, communicatively interconnects each particular TCD 106a, b, c and the CH 102. The network 100, such as the Internet 100a, also communicatively interconnects the CH 102 and the MS 104. Each respective TCD 106a, b, c is, thus, communicatively connected, via the "always on" network 100, to and through the CH 102 and the MS 104, according to the particular arrangement.

The TCDs, as illustrated in the figures and descriptions, can be any of a wide variety of communications devices and elements, capable of communicating telemetry signals and the like over an "always on" network, such as the network 100, for example, the Internet 100a. Of course, the variety of possible TCDs can have numerous types of differing configurations. In each of the scenarios, the TCD is connected to a local network such as, but not limited to, Ethernet or Token Ring, which is connected to the "always on" network 100 (for example, the Internet 100a), via a wide variety of present and future different methods. Merely for example purposes, the connections to the network 100 are shown as DSL 202a,c of TCD 106b, Leased Line of TCD 106a, and Cable Modem 204a of TCD 106c. Numerous and wide variety of other, different, and further devices such as Personal Computers, Printers, Mail Servers, and other processing and other hardware and software at each site, is nevertheless connected to the same Ethernet or Token Ring network and provides the connectivity with and to the "always on" network 100, such as the example of the Internet 100a.

Additionally, in certain embodiments not shown in the Figure, each respective TCD 106a, b, c can be communicatively connected, via other back-up communications paths, to and through the CH 308 to the MS 310, as desired in the particular arrangement. Further possibilities, as examples of such back-up communications a wireless back-up path or other, are hereafter shown in connection with FIG. 4 below.

In operations of the system 200, each of the TCDs 106a, b, c communicatively connects to the CH 102 (or other source) for purposes of encryption key exchange in order to secure telemetry communications made between the TCDs 106a, b, c and the CH 102 and MS 104 over the "always on" network 100. In the example shown in FIG. 2, each TCD 106a, b, c can wirelessly, via the other path mentioned with respect to FIG. 1. The wireless communication network 202 of FIG. 2 can, for example, provide this other path. The wireless communication network 202 is, for example, a Global System for Mobile communication (GSM), General Packet Radio Services (GPRS), Short Message Service (SMS), third-generation wireless (3G) and/or any other current or future wireless communications technology, standard, or system.

The wireless communication network 202 (or any such other path for secure exchange as previously mentioned in connection with FIG. 1) provides for the initial secure information exchange in the system 200, such as required for exchange of data and information of encryption keys and the like. Such initial secure information exchange in the system 200, by another path such as the network 202, enables key exchange and the like that then secures the operations of the "always on" network 100 in order to provide secure, efficient, and robust telemetry operations and capabilities over the "always on" network 100. Of course, as mentioned with respect to FIG. 1, any secure exchange of security keys and the like as initiation of security for the entire system 200 in and for telemetry communications over the "always on" network, could be by other secure path, including such as personal hand delivery, mail, e-mail or other similar mode so long as this exchange is secure in accordance with the desired level of security for the operations of the system 200.

The communicative channel for the connection can be wireless, wired, or a combination. In any event, the communicative channel (or channels) of the respective TCDs 106a, b, c enable identification and authentication information corresponding to the respective TCDs 106a,b,c to be communicated to the CH 102. The CH 102 then identifies and authenticates the particular TCD 106a, b, c. The CH 102 communicates the identity of the particular TCD 106a, b, c, to the relevant MS 104. In certain embodiments, the respective TCDs 106a, b, c are identified and authenticated because of a particular Calling Line Identity (CLI) of the particular TCD 106a,b,c, such as a telephone number or other identifier as the CLI.

In operation, the respective TCDs 106a, b, c, or other equipment such as cell phones or other communication devices that a system installer can employ, communicate to the CH 102, over wireless, wired or combination channels comprising the other path of communications for the initial secured exchange of security encryption keys and setup data. In the example of FIG. 2, the TCD 106a, for example, itself is capable of wirelessly communicating to the CH 102 over the cellular system infrastructure network 202, such as, for example, a GSM network 214, a GPRS network 216, or other. Also in the example of FIG. 2, each of the other TCDs 106b, c communicate, wirelessly or through other secure exchange paths, which could but need not be the wireless infrastructure network 202, and could be POTS, hand delivery, or other secure exchange, to the CH 102 over the cellular system infrastructure.

In each such instance, notwithstanding the nature of the path for exchange of key and initiation data by the TCDs 106a, b, c and the CH 102, these initial communications by the respective TCDs 106a, b, c and the CH 102 provide identifying network information (such as the applicable CLI) to the CH 102, as to the TCDs 106a, b, c themselves and the "always on" network 100.

Thereafter in the initiation of telemetry operations via the TCDs 106a, b, c, the CH 102 notifies the MS 104. In this notification, the CH 102 generates in conjunction with the MS 104, and exchanges private shared keys with the respective TCDs 106a, b, c and the MS 104, for purposes of all subsequent telemetry communications between these devices over the "always on" network 100. All communications of the respective TCD 106a, b, c thereafter, with the CH 102 (or, according to the application and arrangement, possibly MS 104 in certain arrangements) are then encrypted at the transmission device and decrypted at the receiving device, as applicable. Any telemetric information from any of the respective TCDs 106a, b, c is routed via the "always on" network 100a, in encrypted form from the TCD 106a, b, c to the CH 102. The CH 102 then communicates encrypted information to the MS 104, including, but not limited to, via the "always on" network 100, in respect of the telemetry information signaled by the applicable TCD 106a, b, c.

The MS 104 itself, or the CH 102 based on information from the CH 102, the MS 104 or even information from the applicable TCD 106a, b, c, according to the desired implementation and application, then dictates how/whether to handle any communicated telemetry information, including, for example, actions to take, applications to employ, human decision making or direction in response to the information, directing of information to other sources, and so forth. Of course, the MS 104 can be any of a wide variety of monitoring elements, including a separate cell phone or other communicative device, a centralized monitoring infrastructure of a security company, a site located security system and alert or action initiator, applicable authorities, such as police or security company, or any of a wide variety of other possibilities, as applicable for the system and arrangement. Also, the MS 104 can direct communications of applicable information to other devices and locations.

Figure 3:
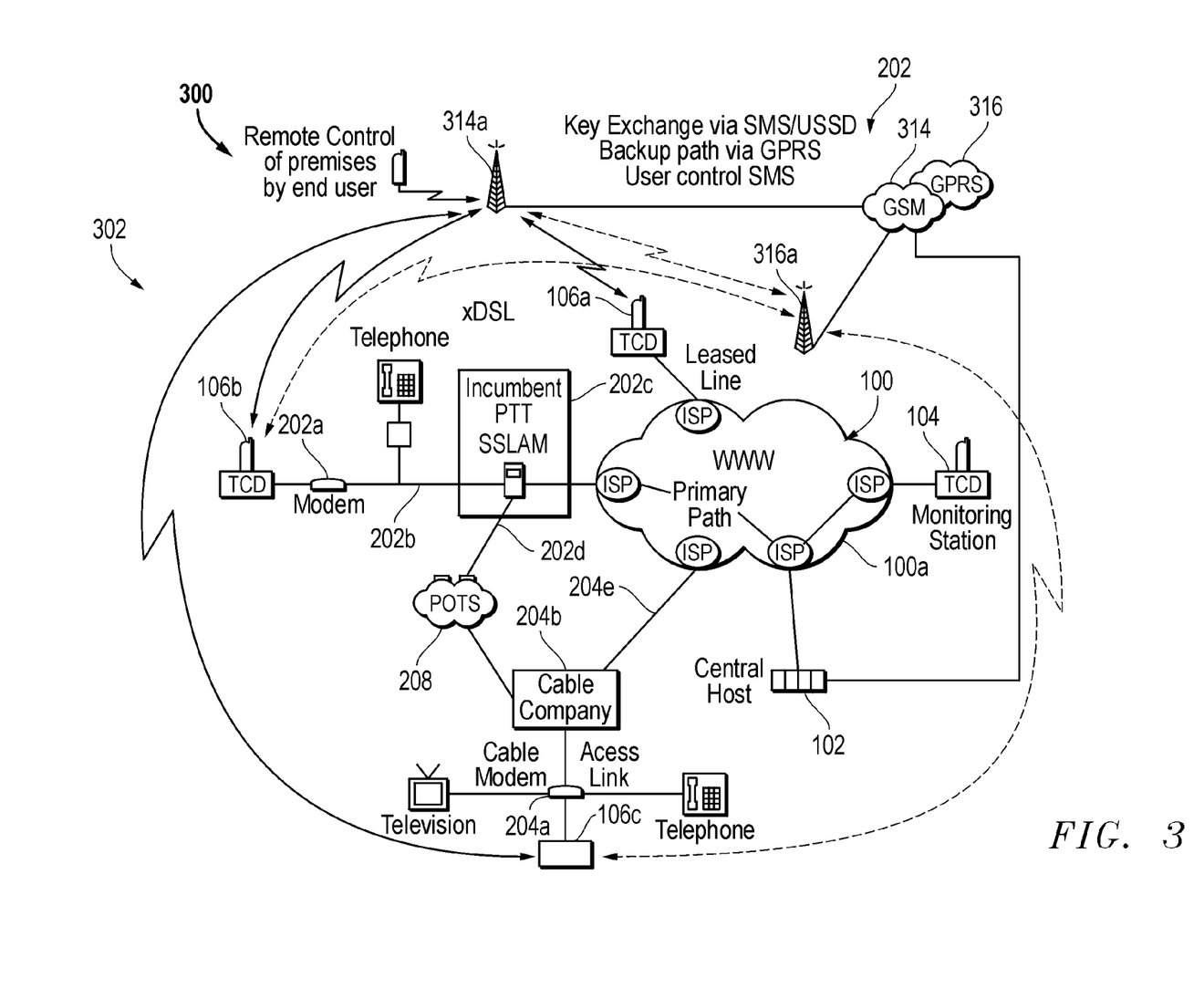
FIG. 3 illustrates a telemetry system of the type of FIG. 2, including a back-up path for telemetry communications if the "always on" network is inoperable, according to certain embodiments of the invention.

Referring now to FIG. 3, in conjunction with FIG. 2, the system 200 of FIG. 2 is shown in an implementation, identified as the system 300 in FIG. 2, that includes the elements and aspects of the system 200, together with an additional back-up telemetry communication path 302 for providing the "always on" path, in the event of any downtime or inoperability of the primary "always on" network 100. The back-up path 302 can be any of a wide variety of communications pathways, for delivery and receipt of telemetry information, such as security signals and alerts.

As was previously mentioned, even an "always on" network 100 can be inoperable or unavailable in certain instances. Therefore, the back-up path 302 can be utilized for delivery and receipt of telemetric information, in the event of unavailability of use of the "always on" network 100. Such back-up path 302 provides added security and telemetry possibilities, for example, in the most intensive security implementations.

In the example of FIG. 3, one form of the back-up path 302 is the GSM network 214 or GPRS network 216, via wireless communications of the telemetry information by the TCD 106a or the TCD 106b. The TCD 106b can also or alternatively include as the back-up path 302 the POTS 208. Similarly, the TCD 106c has as the back-up path 302 a variety of possibilities, including also the GSM network 214 or GPRS network 216, and also or alternatively the POTS 208 or cable company 204b via the cable connection and modem 204a. In all implementations of the example of FIG. 3 and the system 100, 200 of FIGS. 1 and 2, respectively, the concept of an "always on" network 100 for communications of encrypted telemetry information, can be coupled with any back-up communications channel for such encrypted telemetry information, and all such possibilities now or in the future available apply in the embodiments. The implementation and execution of the systems 100, 200, 300 and the method 400, hereafter detailed, in every event includes all possible implementations according to the basic concepts of at least an "always on" network 100, such as the Internet 100a, for telemetry systems.

The systems 100, 200, 300 of FIGS. 1, 2, and 3, respectively, can also include various applications, such as, for example, mobile wireless device(s), browser(s), and others, configured with the equipment and softwares available at each of the TCDs 106a, b, c, the CH 102, the MS 104, and the infrastructural systems and equipment of the network 100 and separate path 202 and back-up path 302. Additional, fewer, alternative and combinations of applications are possible in the systems 100, 200, 300 as those skilled in the art will know and appreciate, and the several described herein are merely intended as examples for purposes of the description. All such alternatives, additions, and combinations, now or in the future known or arising, are included in the description herein.

In the systems 100, 200, 300, any of the TCDs 106a, b, c, the CH 102, and/or the MS 104 can be mobile or fixed, with respect to the rest of the particular systems 100, 200, 300, and each with respect to the other. In every event, communications between devices can be via wired connection, wireless connection, other communications paths and vehicles, or combinations.

Figure 4:
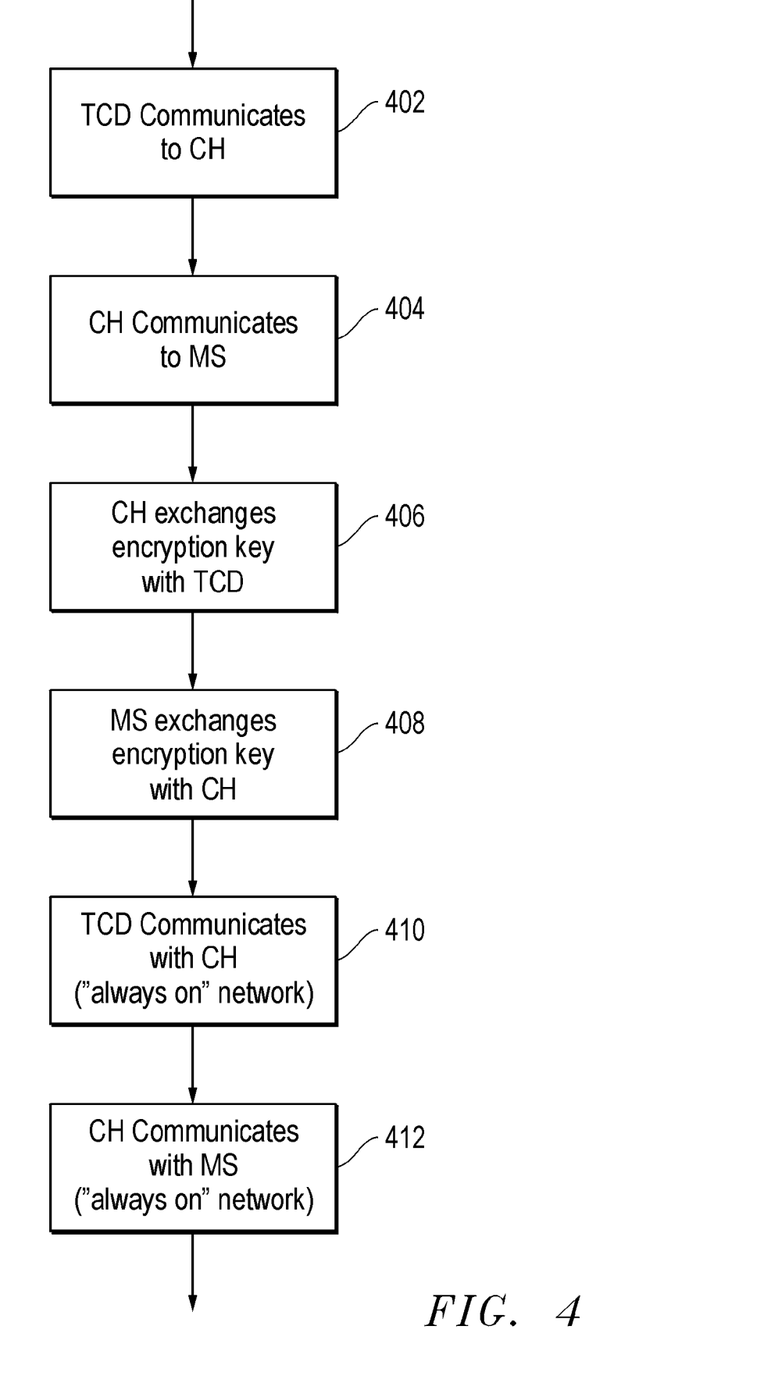
FIG. 4 illustrates a method of operation of the telemetry systems of FIGS. 1 and 2, including exchange of encryption keys and encrypted communications over an "always on" network, such as the Internet, according to certain embodiments of the invention.

Referring to FIG. 4, a telemetry method 400 of the systems 100, 200,300 commences with a step 202 of a TCD 106a, b, c communicating to the CH 102 over a secure communication path, such as by cellular communication and identity and authentication available through applicable CLI or other similar identifiers or any other secure path of exchange. In one example of the step 202, the communication by the TCD 106a, b, or c, to the CH 102 is over wireless communication paths, for example, GSM, GPRS, SMS or 3G. The communication in the step 202 by the TCD 106a, b, or c to the CH 102 includes data, such as packetized data according to a conventional protocol, for example, the Transport Control Protocol/Internet Protocol (TCP/IP). Initially in the communication of the step 202, the CH 102 identifies and authenticates the particular TCD 106a, b, or c, by for example Calling Line Identity (CLI) information, as is conventionally available to the CH 102 in wired or wireless communication of the TCD 106a, b, or c, as applicable, to the CH 102.

Once the CH 102 identifies and authenticates the particular TCD 106a, b, or c, the CH 102 communicates to the MS 104 in a step 204. The communication by the CH 102 to the MS 104 is over either wired, wireless or other paths having similar security precautions, and, if wireless channels are employed, then the communication is, for example, via GSM, GPRS, SMS or 3G. The communication by the CH 102 to the MS 104 includes data, such as packetized data according to a conventional secured protocol, for example, the SIA protocol encapsulated in the Transport Control Protocol/Internet Protocol (TCP/IP), or any other secured path of exchange. In step 204, the MS 104 is alerted of the TCD 106a, b, or c, and the MS 104 thereby maintains a monitoring state to receive any telemetry signal communicated from the particular TCD 106a, b, or c.

In a step 206, the CH 102 communicates to the TCD 106a, b, or c, as applicable, a private (shared) encryption key (also sometimes referred to as "symmetric key" in the trade). The communication of the key by the CH 102 to the particular TCD 106a, b, or c can be by wireless path or other secure path assuring identity and authentication. Of course, alternatively, the TCD 106a, b, or c can receive the key from the CH 102 in any other conventional delivery manners previously mentioned in which security and identity are known.

Once the key is communicated to the TCD 106a, b, c, then the step 410 of communications between the TCD 106a, b, c and the CH 102 occur over the "always on" network (or any back-up path, as may be applicable in the arrangement and level of security desired). The communications between the TCD 106a, b, c and the CH 102 are encrypted be each of the respective TCDs 106a, b, c and the CH 104 for transmitting over the network 100, and decrypted by the receiver of the encrypted communication, either the CH 102 or the applicable TCD 106a, b, or c. The encrypted communications between the TCDs 106a, b, c and the CH 102, are thusly made over the "always on" network 100, such as the Internet 100a. Of course, as previously discussed, the "always on" nature of the network 100 (and, if applicable, as any telemetry system comprising any similarly "always on" back-up path) permits "always on" communicative connectivity between the TCDs 106a, b, c and the CH 102 for telemetry monitoring and signaling in secure manner.

In a step 208, the CH 102 similarly communicates to the MS 104 a private (shared) encryption key (also sometimes referred to as "symmetric key" in the trade). The communication of the key by the CH 102 to the MS 104 can likewise be by any pathway that ensures security, according to the level of security desired, of the communication of the key exchange between the CH 102 and the MS 104. For example, a wireless call between the CH 102 and the MS 104, with applicable CLI assurances, can be the vehicle for the key exchange. All other alternatives previously mentioned are also possible, such that the CH 102 can communicate the key to the MS 104 in any other conventional secure delivery manner.

In a step 412, once the key is communicated to the MS 104 by the CH 102, all communications thereafter between the CH 102 and the MS 104 are encrypted and can occur over the "always on" network 100 (or any applicable back-up "always on" path, per the application and desired level of the security) in such manner. The respective CH 102 and MS 104 each encrypt each respective communication for transmitting over the "always on" network 100 to the other, and the receiver of the communication then decrypts the communication so received.

In any security or telemetry event at the TCD 106a, b, c (or reported to or available to the TCD 106a, b, c, for telemetry signaling), the TCD 106a, b, or c, then, in the step 410, communicates encrypted information in respect of the event to the CH 102. The communication of the encrypted information is over the network 100. The CH 102, in the step 412, decrypts this information and on re-encrypting the information communicates the information in respect of the telemetry, to the MS 104. This communication of the encrypted information by the CH 102 to the MS 104 is also carried over the network 100.

In continued operations, the CH 102 ensures via its communications with the MS 104 that correct information for the TCDs 106a, b, c is sent to the MS 104. The CH 102 also confirms that the correct TCD 106a, b or c is supplying the information, because of the encryption of communications via the exchanged encryption keys for the network 100 communications and the encrypted data of those communications, and then assures that communications of the TCD 106a, b, or c, as applicable, are correctly directed to the MS 104 in encrypted state and over the network 100.

Notwithstanding that the network 100 has been described as "always on" in the foregoing, those skilled in the art will understand and appreciate that even the Internet or other similar "always on" network can be non-operational at particular instances. The systems 100, 200, 300 and the method 400, therefore, each contemplate and can include appropriate elements for a back-up path for communications between each of the TCDs 106a, b, c and the CH 102, on the one hand, and the CH 102 and the MS 104, on the other hand, as has been alluded to. In certain embodiments, therefore, if the network 100 is non-operational at any instance in which communications between any of the TCD 106a, b, c, the CH 102 and/or the MS 104 are required or desirable, then the communications of encrypted information are instead made over the back-up path. Although the back-up path should not be considered herein as any particular present or future communications path, as all are possible in the embodiments, the back-up path can include, for example, GSM, GPRS, SMS, 3G or any other wireless or wired communications, including POTS or other connection, or combination of connections, between the respective TCDs 106a, b, c and CH 102, or CH 102 and MS 104, as applicable. The back-up channel can also be a similarly "always on" connection, and it is preferable that it is so if high levels of security and operability are important in the applications.

Further, in operations, the back-up path can be automatically invoked when or if the primary "always on" network is inoperable or unavailable. Alternately, the back-up path can be manually invoked by a user of the TCD 106a, b, c, or by another means at the CH 102 or MS 104. Additionally or alternately, the back-up path can always be additionally employed in all or certain of the communications between respective devices, i.e., between and among the TCDs 106a, b, c, the CH 102, and/or the MS 104.

Although not shown in detail in the Figures or with respect to the systems 100, 200, 300 or method 400, the MS 104, the CH 102, and even the TCDs 106a, b, c can communicate with and operate other applications based on telemetry or other applications or other communications between and among devices. Example applications, can include separate mobile wireless devices (e.g., a wireless telephone or personal digital assistant (PDA)) that can communicate wirelessly or over wires or combinations with the CH 102, the MS 104 and/or the TCDs 106a, b, c, via the network 100 or other communications network or channel; browsers such as on a personal or laptop computer communicatively connected, by wired, wireless or combination channel, with any or all of the TCD 106a, b, c, the CH 102, and/or the MS 104; and any of wide variety of other applications that are similarly communicatively connected or accessible. The applications can invoke other applications, direct further communications in any and all possible manners, handle or initiate handling of telemetry signals, permit accounting and payment vehicles and options, control telemetry devices, check states and status of telemetry devices, and otherwise dictate results and operations of the systems 100, 200, 300 and/or method 400 and its and their elements and applications.

Figure 5:
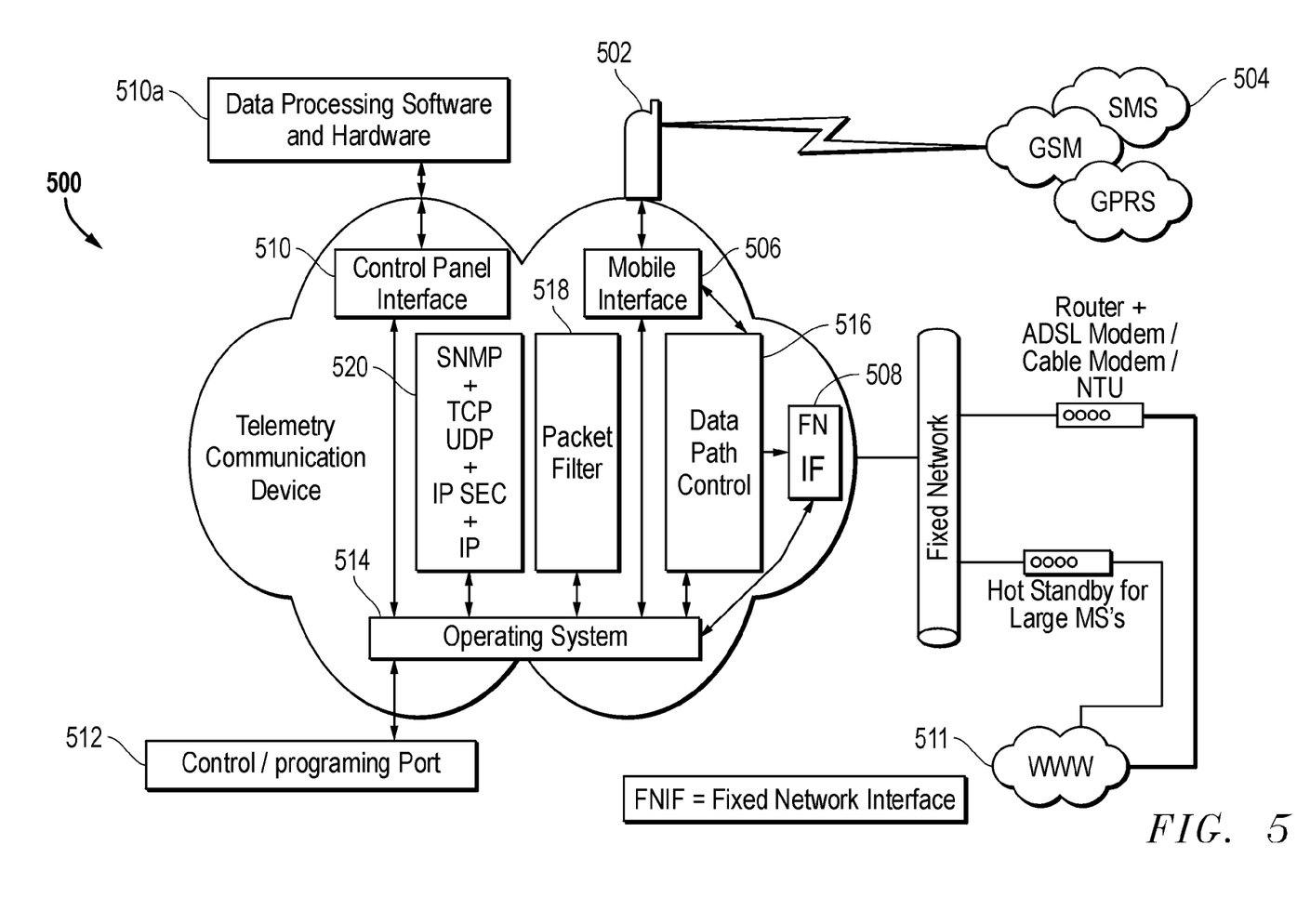
FIG. 5 illustrates an interface of a telemetry communications device of the type in the telemetry systems of FIGS. 1, 2, and 3 and according to the telemetry method of FIG. 4, according to certain embodiments of the invention.

Referring to FIG. 5, a example embodiment of a telemetry communication device, such as TCD 106a, b, c or other, includes an interface 500 that enables the communicative connections, and/or is capable of being communicatively connected when telemetry operations are desired. The interface 500 of FIG. 5 is shown as communicatively connected, or connectable, to a wireless network 502, such as, for example, GSM, GPRS, SMS, 3G, or other. Of course, in other applications, the interface 500 can be communicatively connected to any wired, wireless or combination network in order to permit the interface to operate the TCD 106a, b, c, or other device, to communicate over the "always on" network 100.

The interface 500, includes radio frequency (RF), satellite, wired, cellular wireless, other wireless, or other appropriate transmission and reception features for connectively communicating to and over the network 100, another communications path, or any "always on" back-up path. The interface 500, in any event, includes a fixed network interface 506, which includes any applicable access elements (such as, for example, wire connection, modem, router, or others) for appropriate transmission and reception over the communicatively connected "always on" network 100, such as the Internet 100a or other.

The interface 500 has a control panel interface 510 that connects to a control 510a as a physical input device for a user of the interface 500. The control panel 510 is the telemetry system control panel served by the TCD 106a, b, or c, and can have an event and environment data collection system/network (alarm system) connected which it controls and all gathered data is passed to the control panel 510 from the devices connected to the network. The control panel 510 wraps that data in a protocol for transmission to the MS 104 and or any end user remote control (not shown in detail in the Figure). The control panel 510 receives data from the MS 104 or end user remote control, if applicable, via the CH 102. The interface 500 also has a control/programming port 512 as another physical input device for use by the user of the TCD 106a, b, c and interface 500 in setting choices for operations and other operational characteristics of the TCD 106a, b, c. The control panel interface 510 connects to an operating system 514 of the TCD 106a, b, c. The operating system 412 runs on a processor or other logic or control element or feature (not shown in detail) of the TCD 106a, b, c, in order to enable and control TCD 106a, b, c operations. Via the physical control panel 510a, the user of the TCD 106a, b, c can input information via the control panel interface 510 to the operating system 514, in order to choose among options, input variables, and otherwise control and tailor the operations of the TCD 106a, b, c.

The operating system 514 operates and controls functional elements of the TCD 106a, b, c and interface 500 thereof, including a mobile interface 506, a data path controller 516, a packet filter 518, and a protocol formatter 520. The operating system 514 is communicatively connected to each of the mobile interface 506, the data path controller 516, the packet filter 518, and the protocol formatter 520. The mobile interface 506 is also communicatively connected to the data path controller 516. The data path controller 516 is communicatively connected to the fixed network interface 508. Additionally, the fixed network interface 508 can be communicatively connected to the operating system 510.

In operation, a user of the TCD 106a, b, c, via the interface 500, inputs variables and parameters, from among choices presented by the TCD 106a, b, c, to dictate the operations of the operating system 514. In the instance of a telemetry event with respect to any TCD 106a, b, c, the control panel 510 collects the event and environment data and initiates the network alarm system. The collected data is passed to the control panel 510 from the security devices with respect to the particular TCD 106a, b, c. As previously described, the control panel 510 wraps the collected data in a protocol for transmission to the MS 104 and or end user remote control, and it will also receive data from the MS 104 or end user remote control via the CH 104.

EXAMPLE

Further details of certain embodiments and alternatives are hereafter provided.

In the telemetry systems described herein, the TCD is typically located remotely from the CH and the MS, for example, the TCD is at a customer premises and is customer premises equipment (CPE). Additionally, the CH and the MS may be remotely located with respect to each other, including the MS can be a mobile device such as another TCD having monitoring capabilities and applications.

Data transmitted between the TCD and the CH, and between the CH and the MS, regarding telemetric information is according to a networking protocol, such as, for example, TCP/IP protocols typically over the public Internet, a private Intranet, or a combination of both utilizing an "always on" network of these sorts.

Communications over the "always on" network are secured, and authenticity is assured, by use of private (shared secret) encryption keys exchanged between respective communicating elements, including between the TCD and the CH and between the CH and the MS.

When increased security and reliability is required in the applications, a wireless path or channel, for example, cellular according to GSM, GPRS, SMS, 3G or the like, is employed for the exchange of the private encryption keys and IP addresses of the elements, such as of the TCD, the CH and the MS, are negotiated between the devices via GSM networks utilizing SMS/GPRS or other. The private key and IP address information so exchanged between the elements is then used to permit encrypted communications between the elements over the "always on" network.

A back-up channel can be provided, such as using GSM/GPRS and the encrypted key encryption of communications between elements, in order to permit communications of telemetric information even if the "always on" network is unavailable, inoperable or otherwise unsuitable in any event.

The remote TCD is identified and verified by the CH via communications over a wireless channel, and by virtue of network identifiers such as CLI information. Once the identify and verification of the TCD is achieved, the TCD and CH further communicate over the "always on" network, which can include wired, wireless or other communicative interconnection. The CH ensures that telemetric information and other data from the particular TCD is sent to the correct MS, and visa versa.

Once the "always on" network connection of the TCD and CH, and of the CH and MS, is established, encryption keys for the back-up channel, such as a wireless communication channel, are exchanged between the TCD and CH, and the CH and MS, over the "always on" network.

The CH records all transmitted information to and from the CH, as a confirmation of all communications. Further processing of the recorded information at the CH can be used as management information and for other value added services to telemetric security customers.

The MS can serve a centralized function for telemetric monitoring based on communications of telemetric information by pluralities of TCD and other CPE devices, remotely located from the MS. Additionally or alternatively, the MS can be user-maintained and operated equipment, such as a cell phone or other communicative device of the user/monitor. Data and information at the CH or the MS can, in certain arrangements, be made available for access and viewing over the "always on" connection, for example, via a standard browser and voice switched services. Arrangements of the system can also provide for encrypted communication a standard browser to view data regarding local conditions at respective TCD or other CPE devices, as all such information can be stored and appropriately accessed via the CH over communicative connections therewith. Communications both to the CH from the TCD, and also from the CH to the TCD, can be implemented and facilitated in order to allow devices communicating with the CH over communications networks to send data and information via the CH to the TCD. The CH records and stores all such communications.

Moreover in the system, telemetric and other data transmitted from the TCD located at remote premises can be relayed via GSM SMS/GPRS, through CH, to another TCD serving as the MS or otherwise, such as, for example, to a mobile phone at another remote location. Similar communications can permit control information generated from the TCD serving as the MS or otherwise, such as the mobile phone, to be sent to the TCD at the remote premises via GSM SMS/GPRS. All of the data and telemetric information so communicated can be recorded and stored by the CH.

I. Internet Telemetry Signaling in the System

A. End User Telemetry Communication Device

The TCD device at the remote premises being monitored by the telemetry system includes the following:

Control Panel Interface (e.g., The control panel connected to this interface forms part of an event and environs monitoring and or control system such as but not limited to an intruder alarm system)
Fixed Network Interface
Mobile Network Interface
Operating system including Protocol Stacks
Management Interface The Control Panel Interface can include conventional functions and protocols, as well as future and new video and audio systems. Only authorized data is passed through to the Control panel Interface. The Control Panel Interface features can include, but need not be limited to the following:
Ethernet
Wi-Fi
RS232
Parallel pin contacts The Fixed Network Interface can include conventional functions and protocols, as well as future systems and methods, including but not limited to:
Ethernet
Token Ring
Wi-Fi
RS232

A separate mobile network interface is employed if increased security and reliability is sought. The mobile network interface can include a mobile device physically connected to or incorporated in the TCD, capable of wireless channel communications according to conventional or future protocols and technologies, including for example, GSM, GPRS, SMS, 3G and others, as well as future replacement and alternative technologies.

The Operating system comprises firmware and operating hardware.

The Management Interface is protected from unauthorized access, for example, by user name and password authentication or other security mechanisms at the TCD.

Firewall type functions (e.g., to prevent hackers or other unauthorized access to the telemetry system via the TCD, both internal and external access) can also be included in the TCD. These functions can include the following:

Packet Filtering, to discard packets that are:
Destined for the control panel interface from any other than the CH IP address range. The IP address range can be modified by the CH administrator where necessary. The modifications can be made, for example, using the back-up channel for communications of change information and controls. IPv6, as well as IPv4, are supported.
Internet Control Message Protocol (ICMP) packets features can be manually turned on or off via the back-up channel communications if installed for testing/diagnostics.
Exceptions to the ICMP protocol are enabled in order to insure proper operations if the Internet is the "always on" connection, and these exceptions include:
Source quench so that the TCD can determine when the destination network, i.e., the Internet, is unavailable because of excess communications traffic or otherwise.
Echo request (ping) outbound so that internal hosts can ping external hosts.
Echo replies inbound so that hosts that are outbound pinged can reply.
Destination unreachable inbound so that internal hosts know when an external address is unavailable.
Service unavailable inbound so that internal hosts can detect and determine if and when an external address is unavailable.
Time to Live (TTL) exceeded inbound so that internal hosts can detect and know when an external address is too far away.
Redirect inbound can be automatically logged after being dropped, so that the TCD can trace sources of potential hackers.
Source routing packets.
Incoming connection requests to none active ports.
Incoming connection requests from IP addresses that are not part of the addresses allocated to the CH.
Malformed packets.
Routing information protocols such as RIP and OSPF.
And others, as well.
IP Tunnelling capability, to permit set up a Virtual Private Network circuit between the TCD at the remote premises and the CH.
IP SEC Triple DES (equivalent or better) to encrypt the data payload, including telemetric information, within the VPN circuit.

B. TCD at Remote Premises Protocol Set Up

The CH has available information regarding each remote TCD, including the serial number and type of each TCD that can be expected to contact the CH. With this information, the CH can identify the appropriate encryption key to be used for encrypting and decrypting data and information of the initial communications to and from the TCD.

If the TCD does not have any wireless communications capability or channel for communicating the initial communications to and from the CH, the TCD can nonetheless make a call over whatever communications channel is available to the TCD, to an authentication server, at the CH. The TCD hardware serial number and an agreed customer password for the TCD can then be recognized by the CH, and communications over the "always on" network are thereby authorized and can proceed, including via encrypted communicated data over the "always on" network using previously agreed and shared encryption keys. Each key is different for each TCD device. Communications over the "always on" network continue with exchange between TCD and CH of new keys periodically, and the new keys can be exchanged within the encrypted payload communications over the "always on" network. The connection over the "always on" network can be monitored, for example, by ensuring regular "Keep Alive" messages within the higher level protocol, such that loss of these messages in the communications for a set period causes the CH to deem the link as out of service and to record the event within a database associated with the CH for onward reporting to CH administration and MS.

If added security and reliability is required for communications between the TCD and CH, a back-up channel for communications, in addition to the "always on" network, can be used, for example, a cellular or other wireless communications channel or other. In operations over the back-up channel, the TCD makes a call, over an available and operable communications channel, such as a fixed link or other, to the authentication server associated with the CH. The server at the CH then recognizes that the TCD has the dual communications channel capability (i.e., over both the "always on" network and also via the back-up channel), from the identification of the TC serial number and an agreed/determined customer password (or other security mechanism). In such instance, the CH returns communication of a reply message including the public IP address from the where the TCD is calling. This reply message of the CH is communicated as encrypted using the pre-agreed/determined encryption key.

The TCD then, by means of GSM Short Message System (SMS), GPRS, or other back-up channel, sends a communication confirmation message of the public IP address and also communicates thereby a new decryption key to the CH. The CH recognizes the TCD, via GSM calling line identity or otherwise, which the TCD user will have previously identified to the CH, for example, as part of the customer set-up procedure for the TCD. The CH, in such instance, confirms the authorization and provides a next new decryption key to the TCD.

Communications thereafter continue between the TCD and the CH over the "always on" network using the new encryption and decryption keys from the CH. In any event, the keys shared between the TCD and the CH can be changed periodically, through communications occurring between the TCD and the CH over the "always on" network, for added security of the communications over time.

All telemetric and other data communicated to and from the TCD and the CH is recorded in a database associated with the CH, for onward reporting.

GSM General Packet Radio Service (GPRS) calls to the TCD can further be set up by the CH periodically, in order to ensure that the TCD is available and operational for service, such as in the event of a failure of the "always on" network or in other situations. Decryption keys for such calls and the communications thereof can be changed regularly over the "always on" network in usual communications between the devices. Likewise, if the back-up channel is in-service due to a failure of the "always on" network, decryption keys for both the "always on" network communications as well as for the back-up channel communications can be exchanged regularly through the back-up channel communications. The TCD periodically attempts to set-up connection of the "always on" network link, during any fault in the "always on" communications while the back-up channel is employed, in order to return all communications to the "always on" network link as soon as it is next available and operational.

C. Telemetry Receiving Centre

In the same way that the customer premises have a Telemetry Communication Device, so too does the Monitoring Station (MS). In the case of small MS's, the MS has a similar TCD to the TCD at the customer premises or other remote location. For such a TCD serving a small MS, the TCD primarily communicates over the "always on" network connection and has back-up channel communications capabilities over another channel, such as GPRS. With large MS servicing large numbers of remote TCDs at premises/locations, GPRS as a backup channel to the "always on" network is also applicable, together with a second "always on" network connection working as a "hot standby". GSM communication connection is for swapping decryption key information substantially as has been detailed.

D. Telemetry Message Switch (Central Host)

The message switch (i.e., the CH) includes multiple functions, for example, the following:

1. TCD identification, authentication and authorization.
2. Receive data from an identified, authenticated and authorized source.
3. Record the data that has been received.
4. Deliver the recorded data to identified, authenticated and authorized recipients.
5. Provide browser services for MS's which include:
   a. Distribution of messages to logged on browsers.
   b. Notification when number of logged on browses is insufficient to effectively handle messages.
   c. Record and process acknowledgements that browser operators have processed messages.
   d. Provide notification when individual messages have not been handled.
   e. Provide management information on effectiveness of each logged on browser.
   f. Provide a mechanism for information and control messages to be transported from the browser operators to the end user application.
   g. Provide distributed telephony services (Voice over IP) for receiving centers that require them.
   h. Other services as they are required.
6. Provide transmission of all messages to and from a MS and associated TCD's, including the following:
   a. Transmission.
   b. Acknowledgement of delivery.
   c. Recording of transmissions and acknowledgements.

The data and information messages to and from TCD's can relate to the following:

1. Single events.
2. Remote meter reading.
3. Remote monitoring of the end users premises surrounding environment.
4. Live audio.
5. Single/multiple frame still pictures.
6. Live video.
7. Remote control of equipment.
8. Remote control of the environment.
9. Measuring, monitoring and controlling end user applications.

E. End User Remote Control & Notification

End users can access telemetric and other information at the CH (and/or MS, as applicable), for example, using a mobile hand set, web browser or other access vehicle. Messages are sent to the CH by the hand set according to SMS/GPRS protocols or other messages. The CH records the messages in a database associated with the CH, for transmission of the information to the end user application at the hand set. Security of data and communications is assured by checking network identifiers such as CLI and user password.

Where required, messages can be transmitted to a mobile number(s) using SMS/GPRS messaging, in addition to the messages being sent to the MS.

Individual end users are able to review data relating to respective own remote telemetric applications, by accessing the CH with a standard browser over either the WWW or GPRS, and to send control data/commands via the CH and the TCD to the applications at the remote premises. Data/commands so sent are recorded at the CH, and are available to the associated MS. Security is assured by virtue of agreed user names and passwords, and, in the case of GPRS, network identifiers such as CLI can also be used as further confirmation of user identity.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises, comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A telemetry system for signaling occurrence of a first event at a first location, comprising:
an "always on" network;
a first sensor communications device communicatively connected to the "always on" network, capable of detecting occurrence of the first event at the first location, the first sensor communications device capable of directly communicating over the "always on" network, the first sensor communications device has a first unique identifier;
a central host communications device communicatively connected to the "always on" network, the first unique identifier uniquely recognized by the central host communications device as corresponding to the first sensor communications device;
a first symmetric key maintained by both the central host device and the first sensor communications device, employed in securing communications over the "always on" network between the first sensor communications device and the central host communications device;
wherein the first sensor communications device, on occurrence of the first event at the first location, indicates the occurrence of the first event by securely communicating over the "always on" network to the central host communications device;
wherein the central host communications device uniquely recognizes the first event as occurring at the first location because of the first unique identifier of the first sensor communications device.

2. The telemetry system of claim 1, wherein the telemetry system is for signaling occurrence of a second event at a second location, further comprising:
a second sensor communications device communicatively connected to the "always on" network, capable of detecting occurrence of the second event at the second location, the second sensor communications device capable of directly communicating over the "always on" network, the second sensor communications device has a second unique identifier; and
a second symmetric key maintained by both the central host device and the second sensor communications device, employed in securing communications over the "always on" network between the central host communications device and the second sensor communications device;
wherein the second unique identifier is uniquely recognized by the central host communications device as corresponding to the second sensor communications device;
wherein the second sensor communications device, on occurrence of the second event at the second location, indicates the occurrence of the second event by securely communicating over the "always on" network to the central host communications device;
wherein the central host communications device uniquely recognizes the second event as occurring at the second location because of the second unique identifier of the second sensor communications device.

3. The telemetry system of claim 2, wherein the telemetry system includes a plurality of sensor communications devices, each respective sensor communications device having a respective unique identifier and communicatively connected to the central host communications device by the "always on" network, each respective sensor communications device uniquely recognized by the central host communications device in communications because of the respective unique identifier.

4. The telemetry system of claim 2, further comprising:
a monitoring station communications device, communicatively connected to the "always on" network, the monitoring station communications device capable of communicating with the central host communications device over the "always on" network with respect to at least one of the first sensor communications device and the second sensor communications device.

5. The telemetry system of claim 4, further comprising:
a first event notification transmitted by the central host communications device over the "always on" network, in response to the central host communications device receiving indication communicated directly over the "always on" network by the first sensor communication device of occurrence of the first event at the first location, to the monitoring station communications device over the "always on" network;
a second event notification transmitted by the central host communications device over the "always on" network, in response to the central host communications device receiving indication communicated directly over the "always on" network by the second sensor communication device of occurrence of the second event at the second location, to the monitoring station communications device over the "always on" network; and a monitor alert of the monitoring station communications device, uniquely responsive to receiving the first event notification as indicative of occurrence of the first event at the first location and uniquely responsive to receiving the second event notification as indicative of occurrence of the second event at the second location, respectively.

6. The telemetry system of claim 5, wherein the monitoring station communications device is mobile and has a unique monitor identifier recognizable to the central host communications device for communicating over the "always on" network with the monitoring station communications device, and the central host communications device is accessed by the monitoring station communications device to receive the first event notification and the second event notification, respectively, over the "always on" network.

7. The telemetry system of claim 6, wherein at least one communicative connection of the "always on" network is cellular radio.

8. The telemetry system of claim 6, wherein at least one communicative connection of the "always on" network is the plain old telephone system (POST).

9. The telemetry system of claim 4, wherein the "always on" network is selected from the group consisting of: Internet, wide area network, cellular link, combination of the Internet with cellular link, combination of Internet with POTS, combination of wide area network with cellular link, and combination of wide area network with POTS.

10. The telemetry system of claim 2, further comprising:
a second secure link communicatively connected to the second sensor communications device and the central host communications device, the second sensor communications device is initially identified and authenticated via the second unique identifier over the second secure link by the central host communications device.

11. The telemetry system of claim 10, wherein the second symmetric key is communicated over the second secure link by the central host communications device to the second sensor communications device upon initial identification and authentication of the second sensor communications device, via the second unique identifier, by the central host communications device.

12. The telemetry system of claim 1, further comprising:
a secure link communicatively connected to the first sensor communications device and the central host communications device, the first sensor communications device is initially identified and authenticated via the first unique identifier over the secure link by the central host communications device.

13. The telemetry system of claim 1, wherein the first symmetric key is communicated over the secure link by the central host communications device to the first sensor communications device upon initial identification and authentication of the first sensor communications device, via the first unique identifier, by the central host communications device.

14. A method of telemetry, comprising the steps of:
providing telemetric devices to disparate locations;
connecting each telemetric device at each respective location to an "always on" network accessed at the respective location of the telemetric device;
determining by each telemetric device any security event at the respective location of the telemetric device;
communicating by each respective telemetric device if any security event occurs at the respective location of the telemetric device, directly over the "always on" network accessed at the respective location of the respective telemetric device, to a central host at a remote location from the telemetric devices;
receiving a plurality of signals from the telemetric devices by the central host, upon occurrence of respective security events at respective locations of respective telemetric devices; and
associating by the central host, in response to receiving the plurality of signals, each respective security event to the respective location and the respective telemetric device of the respective security event.

15. The method of telemetry of claim 14, further comprising the steps of:
identifying each respective telemetric device by a unique identifier for the respective telemetric device;
communicating an indicator of the unique identifier of the respective telemetric device and of a characteristic of the security event upon the security event at the respective location of the telemetric device, by the respective telemetric device, directly over the "always on" network to the central host; and
logging the security event for the respective location of the telemetric device, by the central host, based on the unique identifier of the respective telemetric device and the characteristic of the security event.

16. The method of claim 15, further comprising the step of:
accessing an alert for the indicator, by a communications device remote from the location of the respective telemetric device of the indicator, and remote from the central host.

17. The method of claim 16, further comprising the steps of:
changing location for the step of accessing the alert.

18. The method of claim 17, further comprising the steps of:
accessing the alert at more than one location.

19. The method of claim 16, wherein the step of accessing is automatically performed by push to the communications device, when the communications device is available for communications over the "always on" network.

20. The method of claim 14, further comprising the steps of:
communicating, via a secured link, by each of the respective telemetric devices to the central host, a respective unique identifier for the respective telemetric device, to uniquely identify and authorize the respective telemetric device by the central host;
communicating, via the secured link, to each of the respective telemetric devices a respective unique security key from the central host;
securely communicating between the central host and each respective telemetric device over the "always on" network, via the respective unique security key for the respective telemetric device; and
uniquely recognizing each respective telemetric device communicating with the central host, because of the respective unique identifier for the respective telemetric device.

21. The method of claim 20, further comprising the step of:
communicating the respective telemetric signals between the respective telemetric devices and the central host over a wireless network, if the "always on" network is inoperable or unavailable, wherein the wireless network is selected from the group consisting of: GPRS and GSM;
wherein the respective unique identifier is a calling line identifier (CLI) of the respective telemetric device.

* * * * *